Patented Nov. 20, 1923.

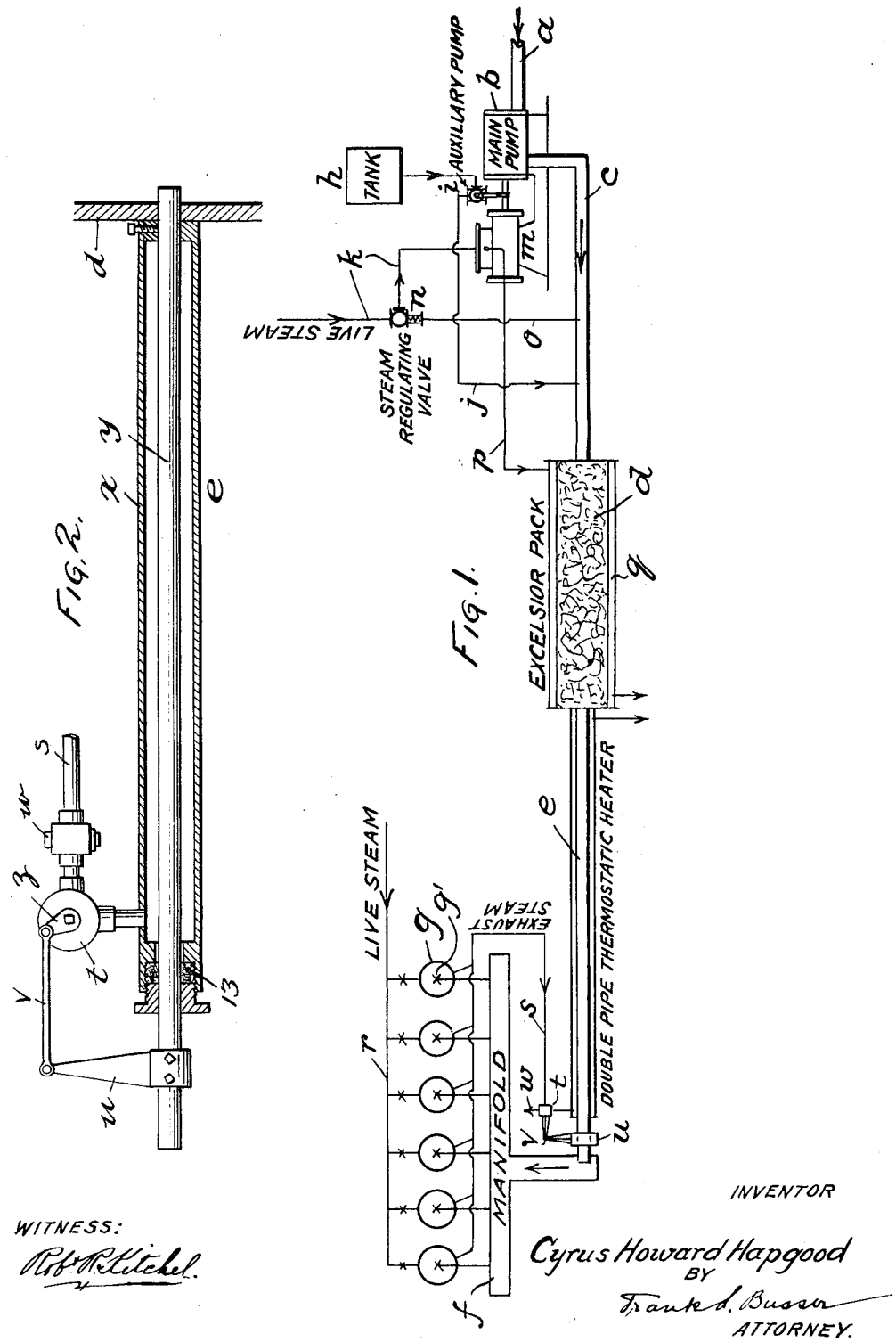

1,474,670

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

PROCESS OF AND APPARATUS FOR RESOLVING EMULSIONS.

Application filed March 25, 1922. Serial No. 546,812.

*To all whom it may concern:*

Be it known that I, CYRUS HOWARD HAPGOOD, a citizen of the United States, residing at Nutley, county of Essex, and State of New Jersey, have invented a new and useful Improvement in Processes of and Apparatus for Resolving Emulsions, of which the following is a full, clear, and exact description, reference being had to the accompanying drawings, which form a part of this specification.

It is known to separate emulsions of oil and water by means of centrifugal separators. It is also known to treat the emulsion with an agent tending to resolve or break down such emulsion so that there passes to the separator a non-emulsified mixture of oil and water, or a relatively weak emulsion thereof, so as to secure a more nearly quantitative separation. It is also known to pass the treated emulsion through a pack of material, such as excelsior, adapted to widely distribute the emulsion and secure its more intimate admixture with the treating agent. It is also known to heat an emulsion of oil and water preparatory to its centrifugation.

The practical execution of these steps is attended with difficulties. The rate of supply of oil must be adjusted to the capacity of the centrifugal machines, which is variable, as, for example, when one or more of a battery of centrifuges are cut out. Further, the rate of supply of the treating agent must be varied with the rate of flow of the emulsion. Again, with a variable flow of treated emulsion to the centrifuges, the amount of heat applied thereto must be varied to avoid overheating.

The skill of the operator cannot be relied upon to effect the adjustments required to maintain the specified conditions essential to efficient operation. The object of my invention is to provide a process whereby these conditions may be maintained automatically.

Another object of my invention is to provide an apparatus adapted to carry out the process with the highest degree of accuracy and reliability.

In the drawings, Fig. 1 is a diagrammatic view of the apparatus. Fig. 2 is a side elevation, partly in section, of the thermostatic heater and the means operable therefrom to control the admission thereto of exhaust steam.

From a source of supply the oil to be purified flows through pipe $a$ to a pump $b$, which forces the oil through a pipe $c$, a pack $d$, a double pipe thermostatic heater $e$, and a manifold $f$, to a battery of centrifugal separators $g$. The inflow of the emulsion to the separators is controlled by valves $g'$.

From a supply tank $h$ flows any suitable treating agent adapted to resolve or break down, or facilitate the resolution or breaking down, of the emulsion of oil and water. A suitable saponifiable oil mixed with an alkali, as, for example, oleic acid, ammonia and soda ash, or some saponifiable fat mixed with an alkali and some neutral material to give it powder form, will be effective. Known compositions of this character, such as "Treatolite" and "Gold Dust" are especially recommended.

A pump $i$ forces this treating agent through a pipe $j$ to the pipe $c$, where it mixes with the oil.

The excelsior pack $d$ effects a wide distribution of the oil-coated water particles or the water-coated oil particles and a more intimate admixture of the treating agent. The emulsion is thereby so far broken down that the centrifuges are capable of effecting a separation into oil containing almost no water and water containing almost no oil.

The pump $i$ is mechanically connected to the plunger of the pump $b$ so that the supply of the treating agent is always properly proportioned to the rate of flow of the emulsion.

On the steam supply pipe $k$ to the engine $m$ for driving the pump $b$ is a steam regulating valve $n$ controlled by the pressure in a pipe $o$ connected with the oil pipe $c$.

Exhaust steam from the engine $m$ flows through pipe $p$ to a jacket $q$ around the pack $d$.

A steam supply line $r$ supplies steam to the turbines or other engines adapted to drive the individual separators. The exhaust steam from these turbines passes through the pipe $s$ to the jacket between the two pipes of the thermostatic heater, thereby heating the oil flowing therethrough to the temperature best adapted for centrifugation. The thermostatic heater is connected with a valve $t$ in the exhaust pipe $s$ (by means well known in the art for controlling a valve from a thermostat). Expansion of one element of the thermostatic heater actuates the valve to more or less restrict the flow of steam to the heater, the excess steam escaping at $w$, thereby regulating the temperature of the emulsion.

In Fig. 2 is shown a known means for controlling the operation of the valve $t$ from the thermostatic heater $e$. This heater $e$ comprises a shell $x$ of iron and a rod $y$ of brass extending centrally therethrough. These two elements are rigidly connected at one end of the heater. At the other end the rod $y$ is slidable longitudinally through a packing joint 13. An arm $u$ is rigidly secured to the projecting end of rod $y$ and is connected by means of a link $v$ with an arm $z$ secured to the shaft of a butterfly valve within the valve casing $t$, this valve being interposed in the exhaust pipe $s$. Also interposed in the exhaust pipe $s$ is a low pressure relief valve $w$. The parts are so arranged that expansion of the thermostatic element $y$, due to rise in temperature, more or less throttles the valve $t$ and thereby lessens the flow of exhaust steam into the heater $e$.

The back pressure of the oil, operating through the manifold $f$, heater $e$, pack $d$ and pipe $c$, controls the steam regulating valve $n$, thereby controlling the speeds of the pumps $b$ and $i$ and the flow of emulsion and treating agent. Thus, if one or more centrifuges $g$ are cut out, the increased back pressure will throttle the steam supply to the pumps, and cut down the flow of emulsion and treating agent. The rate of flow through the thermostatic heater being thereby reduced, the emulsion flowing therethrough tends to overheat, which tendency is counteracted by throttling the exhaust steam valve $t$ in the manner before described.

It will therefore be understood that the whole system is workable entirely automatically. The flow of the treating agent will always be properly proportioned to the flow of the emulsion, the rate of flow of the treated emulsion will always correspond to the capacity of the centrifuges and the temperature of the treated emulsion flowing to the separators will be maintained substantially constant.

There is nothing novel in the individual elements, such as the steam regulating valve, the excelsior pack and the double pipe thermostatic heater, and therefore such elements are not shown or described in detail.

While I have described the process and apparatus as especially adapted to the separation of emulsions of oil and water, the invention is adapted to other uses, as, for example, the treatment of an acid-treated mineral oil lubricating stock with a soda ash solution, for the purpose of more intimately admixing the alkaline solution, preparatory to removal, by centrifugation, of the soap and alkaline water from the oil.

Having now fully described my invention, what I claim and desire to protect by Letters Patent is:

1. The process of separating the constituents of a mixture or emulsion which comprises establishing a flowing stream of the mixture, adding thereto a treating agent adapted to facilitate separation of the constituents, subjecting the mixture to a centrifugal separating action, and regulating the rate of supply of both the mixture and the treating agent by the back pressure of the flowing stream.

2. The process of separating the constituents of a mixture or emulsion which comprises establishing a flowing stream of the mixture, adding thereto a treating agent adapted to facilitate separation of the constituents, subjecting the mixture to a centrifugal separating action, utilizing the back pressure of the flowing stream to vary the supply of the mixture, and maintaining a substantially constant ratio between the supply of the mixture and the supply of the treating agent.

3. The process of separating the constituents of a mixture or emulsion which comprises establishing a flowing stream of the mixture, adding thereto a treating agent adapted to facilitate separation of the constituents, subjecting the mixture to a centrifugal separating action, regulating the rate of supply of both the mixture and the treating agent by the back pressure of the flowing stream, heating the treated mixture before centrifugation, and thermostatically controlling the supply of heat.

4. The process of separating the constituents of a mixture or emulsion which comprises establishing a flowing stream of the mixture, adding thereto a treating agent adapted to facilitate separation of the constituents, subjecting the mixture to a centrifugal separating action, heating the treated mixture before centrifugation, regulating the rate of supply of treating agent by the rate of flow of the mixture, regulating the rate of flow of the mixture by the back pressure of the flowing stream, and varying the supply of heat in accordance with the rate of flow of the mixture.

5. In an apparatus for separating the constituents of a mixture or emulsion, the combination with a separating apparatus, of a pipe line for conveying to the separating apparatus the mixture to be separated, means to supply a treating agent to the pipe line, and means governed by the back pressure in the pipe line to regulate the rate of flow of the mixture of be separated and of the treating agent.

6. In an apparatus for separating the constituents of a mixture or emulsion, the combination with a separating apparatus, of a main pipe line leading thereto, means to supply a treating agent to the pipe line, a pump for forcing the mixture to be separated through the pipe line, and means operative by the back pressure of the mixture in the pipe line adapted to regulate the speed of the pump and the supply of treating agent to the pipe line.

7. In an apparatus for separating the constituents of a mixture or emulsion, the combination with a separating apparatus, of a main pipe line leading thereto, means to supply a treating agent to the pipe line, a pump for forcing the mixture to be separated through the pipe line, a steam line supplying motive fluid for operating the pump, a steam regulating valve on the steam line, a pipe adapted to transmit the pressure in the main pipe line to said valve and thereby control the supply of motive fluid to the pump, and means controlled by the speed of the pump to vary the supply of treating agent.

8. In an apparatus for separating the constituents of a mixture or emulsion, the combination with a separating apparatus, of a main pipe line for conveying to the separating apparatus the mixture to be separated, a pipe for supplying a treating agent to the main pipe, pumping mechanism for forcing the mixture and the treating agent through their respective pipes, a steam line supplying motive fluid for operating the pumping mechanism, a steam regulating valve on the steam line, and a pipe adapted to transmit the pressure in the main pipe line to said valve and thereby control the supply of motive fluid to the pumping mechanism.

9. In an apparatus for separating the constituents of a mixture or emulsion, the combination with a battery of centrifugal separators, of a pipe line for conveying to the separators the mixture to be separated, a double pipe thermostatic heater interposed in the pipe line, a steam line for supplying motive fluid to the separators, an exhaust steam line from the separators to the heater, a valve in the exhaust steam line, and means between the heater and the valve operable by the contraction and expansion of an element of the heater to throttle the valve.

10. In an apparatus for separating the constituents of a mixture, the combination with a separating apparatus, of a pipe line for conveying to the separating apparatus the mixture to be separated, a pack and a thermostatic heater interposed in the pipe line, means to supply a treating agent to the pipe line, and means governed by the pressure in the pipe line to regulate the rate of flow of the mixture to be separated and of the treating agent.

11. In an apparatus for separating the constituents of a mixture, the combination with a separating apparatus, of a main pipe line for conveying to the separating apparatus the mixture to be separated, a main pump, a pack and a thermostatic heater interposed in the main pipe line, a branch pipe connected to the main pipe line for supplying a treating agent thereto, a pump interposed in the branch pipe and operated in unison with the main pump, a valve controlling the flow of motive fluid to the main pump, and a pipe connecting the main pipe line with said valve for transmission of pressure in the main pipe line to said valve, thereby controlling the supply of motive fluid to the main pump.

In testimony of which invention, I have hereunto set my hand, at New York, on this 17th day of March, 1922.

CYRUS HOWARD HAPGOOD.

Witnesses:
R. R. WARREN,
G. D. TALLMAN.